United States Patent
Barnfield et al.

(10) Patent No.: US 10,262,279 B2
(45) Date of Patent: Apr. 16, 2019

(54) MODELING CAREER PATH BASED ON SUCCESSFUL INDIVIDUALS IN AN ORGANIZATION

(75) Inventors: Louise Diana Barnfield, San Carlos, CA (US); Eric William Tomanek, Fort Collins, CO (US); Pramesh Vashist, Pleasanton, CA (US); Klaus Borho, Redwood City, CA (US); Mark Preston Bennett, Livermore, CA (US)

(73) Assignee: Oracle International Corporation, Redwood Shores, CA (US)

( * ) Notice: Subject to any disclaimer, the term of this patent is extended or adjusted under 35 U.S.C. 154(b) by 1404 days.

(21) Appl. No.: 13/371,279

(22) Filed: Feb. 10, 2012

(65) Prior Publication Data
US 2013/0212031 A1    Aug. 15, 2013

(51) Int. Cl.
*G06Q 10/00*    (2012.01)
*G06Q 10/06*    (2012.01)

(52) U.S. Cl.
CPC .............. *G06Q 10/06* (2013.01); *Y04S 10/54* (2013.01)

(58) Field of Classification Search
CPC .......................................... G06Q 10/00–50/00
USPC ................................ 705/7.11–7.42, 320–322
See application file for complete search history.

(56) References Cited

U.S. PATENT DOCUMENTS

| | | | | |
|---|---|---|---|---|
| 6,012,058 A * | 1/2000 | Fayyad | ............. | G06F 17/30705 |
| 8,046,307 B2 * | 10/2011 | Habichler | ............. | G06Q 10/00 |
| | | | | 705/1.1 |
| 8,060,451 B2 * | 11/2011 | Degeratu | ............... | G06Q 10/06 |
| | | | | 705/319 |
| 2002/0026452 A1 * | 2/2002 | Baumgarten | .......... | G06Q 10/10 |
| 2002/0033849 A1 * | 3/2002 | Loppini | .............. | G06F 3/04815 |
| | | | | 715/848 |
| 2002/0156674 A1 * | 10/2002 | Okamoto | ........... | G06Q 10/1053 |
| | | | | 705/321 |
| 2003/0177027 A1 * | 9/2003 | DiMarco | ................ | G06Q 10/06 |
| | | | | 705/321 |

(Continued)

OTHER PUBLICATIONS

Workday—Training and Education obtained at http://www.workday.com/solutions/services/training_and_education.php; on Jan. 10, 2012; 2007-2012 Workday, Inc.; 1 page.

(Continued)

*Primary Examiner* — Alan S Miller
(74) *Attorney, Agent, or Firm* — Trellis IP Law Group, PC (57) ABSTRACT

A system and method for providing career-related information. An example method includes acquiring user information, wherein the user information includes an indication of a target career position or opportunity; obtaining aggregated information pertaining to workers who have attained the target career position; and employing the user information and the aggregated information to provide career-related information pertaining to one or more career paths. In the example method, a user questionnaire is employed to facilitate acquiring the user information. The step of obtaining aggregated information includes collecting anonymous information from profiles of the workers. The profile information may be retrieved from a Human Capital Management (HCM), performance management system, social network system, or other Enterprise Resource Planning (ERP) system component of an organization.

18 Claims, 6 Drawing Sheets

(56) References Cited

U.S. PATENT DOCUMENTS

| | | | | |
|---|---|---|---|---|
| 2005/0093973 A1* | 5/2005 | Hibi | A61B 1/0005 | 348/71 |
| 2005/0114203 A1* | 5/2005 | Savitsky | G06Q 10/10 | 705/320 |
| 2007/0203710 A1* | 8/2007 | Habichler | G06Q 10/00 | 705/320 |
| 2009/0276231 A1* | 11/2009 | Bazigos | G06Q 10/105 | 705/320 |
| 2010/0030743 A1* | 2/2010 | Lim | G06Q 10/10 | 707/758 |
| 2010/0082356 A1* | 4/2010 | Verma | G06Q 10/00 | 705/1.1 |
| 2010/0179916 A1* | 7/2010 | Johns | G06Q 30/02 | 705/319 |
| 2011/0185020 A1* | 7/2011 | Ramamurthy | G06Q 10/10 | 709/204 |
| 2011/0276507 A1* | 11/2011 | O'Malley | G06Q 10/00 | 705/321 |
| 2012/0023030 A1* | 1/2012 | Jeffries | G06Q 10/10 | 705/319 |
| 2012/0226623 A1* | 9/2012 | Jurney | G06Q 50/01 | 705/321 |
| 2013/0006685 A1* | 1/2013 | Kelkar | G06Q 10/00 | 705/7.11 |
| 2013/0144957 A1* | 6/2013 | Sherman | G06Q 10/10 | 709/206 |

OTHER PUBLICATIONS

Successfactors—Business Executive Software obtained at http://www.successfactors.com/development-training/; on Jan. 10, 2012; 2 pages.

* cited by examiner

MODELING CAREER PATH BASED ON SUCCESSFUL INDIVIDUALS IN AN ORGANIZATION

BACKGROUND

The present application relates to software and more specifically to systems, user interfaces, and methods for providing career-related information.

Software that provides career-related information is employed in various applications, including career development websites, employee-employer job matching websites, enterprise Profile Management (PM) software, and so on. Such applications often demand effective methods for collecting and presenting pertinent career-related information.

Effective methods for collecting and presenting career-related information to employees, prospective employees, employers, and prospective employers are particularly important in enterprise applications, where multiple career opportunities and potential career paths may exist, and where effective employee recruitment and retention can significantly impact both the success of an enterprise and its employees.

An employee may wish to know what opportunities are available at a given enterprise; what skills are needed; how to prepare; what career development paths lead to the opportunities; and what immediate steps can be taken to facilitate progressing toward a given opportunity. An employer may wish to know how to retain top performing employees; how to best recruit employees and convey available career growth opportunities; how to encourage employees to seek career progression, thereby encouraging them to develop their skills and knowledge, and so on.

Conventionally, an employee or prospective employee seeking career advancement may look to external (e.g., outside of the enterprise) websites, e.g., Monster.com, Craigslist.org, and so on. However, such websites typically only provide generalized information, which may be inapplicable to specific employee skill sets, career ambitions, and so on. Furthermore, the tendency of employees to seek external websites for career development opportunities may reduce enterprise employee retention.

To address employee retention issues, an enterprise may employ PM software to track employee performance metrics; to facilitate determining competency gaps; and to set employee goals to facilitate scheduling learning activities in view of perceived performance needs. However, such PM software typically does not specifically address an employee's (or prospective employee's) questions pertaining to overall career paths and the requisite skills and steps needed to proceed along a desired path in view of their individual preferences.

SUMMARY

An example method facilitates providing career-related information. The example method includes acquiring user information, wherein the user information includes an indication of a target career position or opportunity; obtaining aggregated information pertaining to workers who have attained the target career position; and employing the user information and the aggregated information to provide career-related information pertaining to one or more career paths, wherein the one or more career paths may lead to the target career position.

In an example specific embodiment, the step of acquiring user information further includes providing a questionnaire to a user and receiving questionnaire answers in response thereto. Obtaining aggregated information includes collecting anonymous information from profiles of the workers. The profile information may be retrieved from a Human Capital Management (HCM), performance management system, social network system, or other Enterprise Resource Planning (ERP) system component of an organization.

The specific example embodiment further includes providing a user option for a worker to offer non-anonymous information to other users of a system employing the method. Another user option enables a worker to indicate a willingness to be a mentor to participants of a system employing the method.

The career-related information may include an indication of a fast track path that may enable a user to attain the target career position in the shortest time. The career-related information may further include an indication of a high performance path, which tends to yield workers who both attain the target career position and excel in the positions. The career-related information may further include an indication of one or more career paths, such as critical role paths, that include one or more positions that are currently being sought by an organization.

The career-related information may further include an indication of one or more user competency gaps to be filled to enable a user to attain the target career position; an indication of one or more immediate career steps that a user may choose to facilitate attaining the target career position; an indication of one or more most commonly followed career steps taken by workers who initially held a similar career position as a user of the method; a listing of existing job positions for which a user is currently qualified to fulfill and a degree to which the user is qualified; a suggestion of an immediate career move that a user may make; an indication of commonly sought career moves in view of a user's existing career; one or more analytics pertaining to the target career or associated career paths, and so on.

The specific example embodiment further includes providing a first user interface option to construct a profile that includes the user information; providing a second user interface option to activate monitoring user progress along a selected career path; providing a third user interface option to change the user information, such as by changing answers to a questionnaire, to yield changed career-related information in response thereto; providing a fourth user interface option to indicate one or more job-related preferences; providing a fifth user option to assign a priority value to a particular job-related preference; providing an administrator user interface option to adjust career opportunities that are indicated or displayed, and so on.

Hence, certain embodiments discussed herein may enable use of anonymous worker information collected or aggregated from one or more ERP system components, in combination with input from a user, to provide individualized customizable career-related information, such as possible career paths; next career moves tasks to perform, and so on. The presented career-related information may account for user career preferences and existing competencies, e.g., skills, knowledge, experience, and performance metrics.

Enabling users to view and analyze career paths based on what has worked for others may assist users in planning for and achieving their career goals, thereby benefiting themselves and the organization for which they work. Furthermore, embodiments discussed herein may facilitate employee retention and recruitment, as available career opportunities within a given organization are more readily visible.

A further understanding of the nature and the advantages of particular embodiments disclosed herein may be realized by reference to the remaining portions of the specification and the attached drawings.

DETAILED DESCRIPTION OF EMBODIMENTS

Although the description has been described with respect to particular embodiments thereof, these particular embodiments are merely illustrative, and not restrictive.

For example, while the present application is discussed with respect to systems and methods for providing career-related information to employees, prospective employees, and employers of an enterprise that employs Enterprise Resource Planning (ERP) software, embodiments are not limited thereto. For example, any organization, website, or other entity may implement an embodiment in accordance with the present teachings without employing preexisting ERP software.

Furthermore, while various example user interface display screens discussed herein are directed to employees or prospective employees, various different or additional user interface display screens may be implemented, such as interface display screens directed specifically toward employers or prospective employers, system administrators, and so on, without departing from the scope of the present teachings. Furthermore, certain embodiments may be tailored specifically for facilitating employee recruitment or specifically toward facilitating user career advancement, without departing from the scope of the present teachings.

For the purposes of the present discussion, an enterprise may be any organization of persons, such as a business, university, government, military, and so on. The terms "organization" and "enterprise" are employed interchangeably herein. Personnel of an organization or enterprise, i.e., enterprise personnel, may include any persons associated with the organization, such as employees, contractors, board members, and so on.

ERP software may be any set of computer code that is adapted to facilitate managing resources of an organization. Example resources include Human Resources (HR), financial resources, assets, employees, and so on, of an enterprise. The terms "ERP software" and "ERP application" may be employed interchangeably herein. However, an ERP application may include one or more ERP software modules or components, such as user interface software modules or components.

A talent management system or application may be any software application or functionality for facilitating selecting, organizing, or managing enterprise personnel or tasks performed thereby. Personnel of an organization may include any persons associated with the organization, such as employees, contractors, board members, and so on. Talent management systems, also called personnel management systems, may be employed in various applications, including, but not limited to, hiring enterprise personnel, determining compensation, developing capabilities, utilizing capabilities, facilitating career planning, employee retainment, employee recruitment, and so on.

A Human Capital Management (HCM) system, also called a human resource management system, may be any software that is adapted to facilitate managing enterprise personnel. Certain HCM systems are adapted to facilitate hiring, retaining, using and developing capabilities of enterprise personnel, and so on. Note that various types of systems may include other systems. For example certain HCM systems may include talent management systems as components thereof.

For clarity, certain well-known components, such as hard drives, processors, operating systems, power supplies, and so on, have been omitted from the figures. However, those skilled in the art with access to the present teachings will know which components to implement and how to implement them to meet the needs of a given application.

Figure 1:
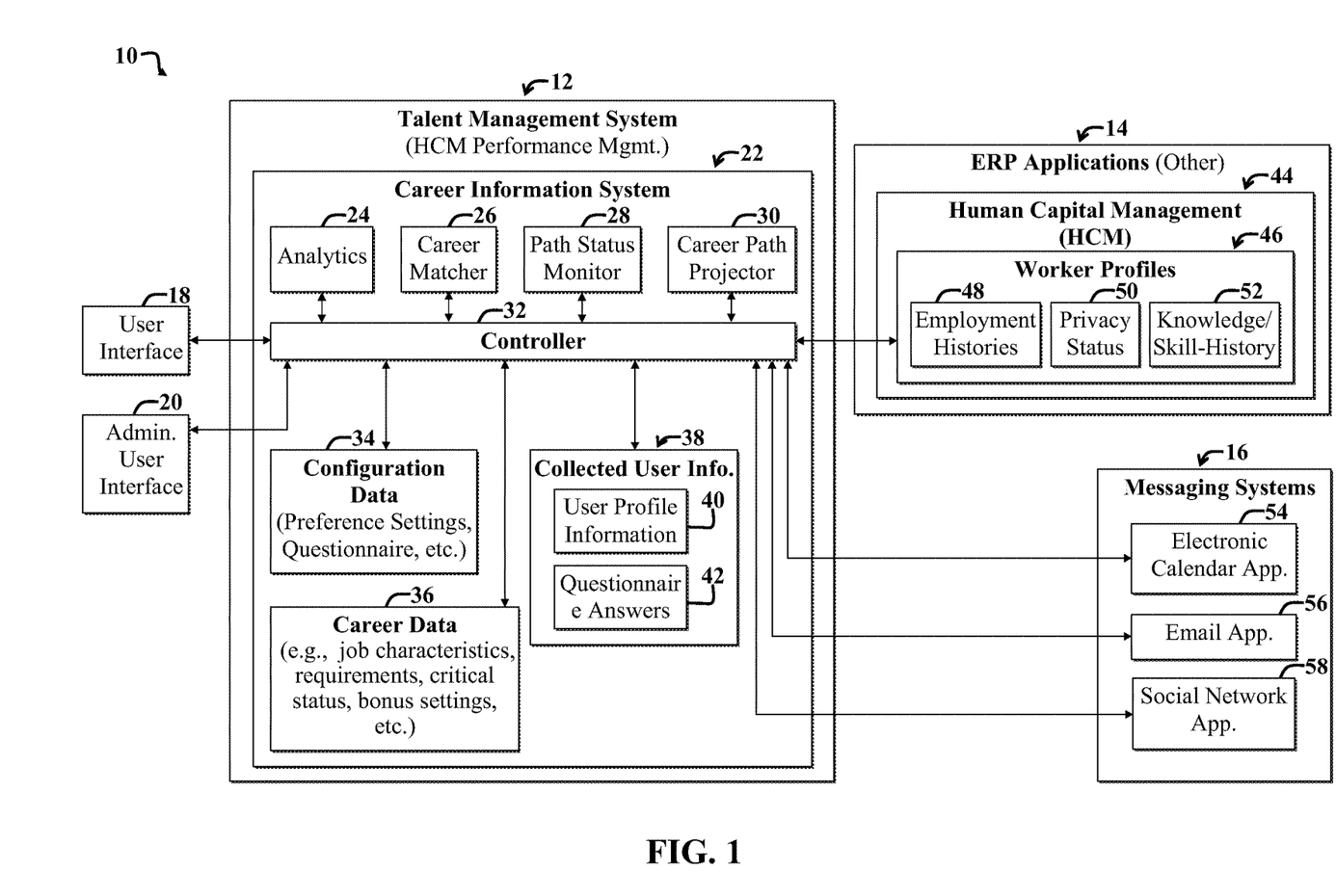
FIG. 1 is a diagram of a first example embodiment of a system for providing career-related information.

FIG. 1 is a diagram of a first example embodiment of a system 10 for providing career-related information. The example system 10 includes a talent management system 12 in communication with ERP applications 14, including an HCM system 44. The HCM system 44 includes various worker profiles 46, which may include, for example, descriptions or other data specifying employment histories 48, privacy status 50 (e.g., an indication of a willingness of a worker associated with a worker profile to share profile information), and knowledge and/or skill 52.

The example talent management system 12 includes a career information system 22, which includes a controller module 32 in communication with an analytics module 24, a career matcher 26, a career path status monitor 28, and a career path projector module 30. The controller 32 includes computer readable instructions (i.e., computer code), for interfacing the modules 24-30 with a user interface module 18 and administrator user interface module 20 and with data maintained by the career information system 22, including configuration data 34 (e.g., user preference settings, questionnaire questions, etc.), career data 36 (e.g., job characteristics, requirements, status, etc.), and collected user information 38, including user profile information 40 and questionnaire answers 42. The controller 32 further interfaces the career information system 22 with the ERP applications 14. For illustrative purposes, the controller 32 is shown further interfacing the career information system 22 with messaging systems 16, including a calendar application 54, email application 56, and social network application 58.

Note that while various modules of the system 10 are shown as separate modules, various modules may be integrated into a single module or computer system, or the modules may be distributed within a network, without departing from the scope of the present teachings. For example, the system 10 may run on a single computer or may run on plural computers that communicate via a network. Similarly, the career information system 22 may be incorporated in a separate software module, other than in a talent management system, without departing from the scope of the present teachings. Furthermore, more or fewer modules than those shown may be employed in an embodiment in accordance with the present teachings without departing from the scope thereof.

The user interface 18 includes Graphical User Interface (GUI) code for providing various user interface display screens, as discussed more fully below, for accessing career-related information. The administrator user interface 20 includes GUI code for enabling an administrator to configure the career information system 22, such as by adjusting configuration data 34, which may affect what information about careers and career paths are displayed to a user, as discussed more fully below.

In operation, a user, such as an employee or prospective employee of a proprietor of the system 10 (or other worker or prospective worker), employs the user interface 18 to view career-related information based on user answers to a questionnaire; what target career a user has selected; what profile information 40 about the user is known by or provided to the career information system 22; what career data 36 the career information system 22 has available; information about career paths followed by other workers, as maintained via the worker profiles 46; configuration data 34; and based on what functionality from the modules 24-30 a user has activated, and so on.

For the purposes of the present discussion, career-related information may include any data pertaining to or related to a career or employment opportunity or career path, including information pertaining to a user seeking a particular career. Examples of career-related information include specifications of job scope, required experience and skills, location, organization, and so on. Additional examples include information pertaining to a user (e.g. employee or prospective employee), such as user knowledge, experience, general qualifications, preferred working hours, preferred organization, preferred benefit options, preferred advancement opportunities, and so on. Career-related information may also include, for example, information pertaining to steps, tasks, intermediate careers, and so on, that may lead to a given career opportunity.

Worker profile information may be any information stored in a database of an organization or enterprise, wherein the information includes career-related information pertaining to the worker. Enterprise software, such as Human Capital Management (HCM) systems often store information about employees or other workers in computing objects or records called profiles.

The controller 32 is adapted to facilitate retrieving and/or storing user information, such as answers to a questionnaire 42 and user profile information 40. Information about careers may be stored as career profiles as career data 36. Similarly, configuration data 34 may maintain questionnaire questions and other preference settings, such as what weights should be applied to a given question by the various modules 24-30 when performing calculations, such as generating analytics, matching users to careers, generating projections of career paths, and so on.

For the purposes of the present discussion, a target career position may include any job, position, or other opportunity for which a user seeks career-related information. A career path may include any sequence of jobs or positions, learning experiences, schooling, or other tasks or experiences between a first career position and a second career position. The second career position may be a target career position.

In an illustrative operative scenario, a user employs the user interface 18 to complete a questionnaire about job-related preferences and to specify a target career position (also simply called target career). The controller 32 stores the resulting user-provided information in collected user information module 38 along with any previously stored user profile information.

When a user selects an option from the user interface 18 to view information about career paths that lead to the specified target career, the controller 32 then activates the career path projector module 30, which retrieves the user information 38 and worker profile information 46. The career path projector module 30 includes computer code for analyzing worker profile information 46 to determine what workers transitioned from the current job position of the user to the target career position. Additional information, such as what skills the workers acquired to achieve the target career position, and information about the sequence of career steps, knowledge acquisition, and skill acquisition that was employed to reach the target career position. The career path projector module 30 then employs the worker profile information 46 and the collected user information 38 to construct one or more representations of various possible career paths a user may take to reach the specified target career position.

Note that various job-related user preferences may be specified in the questionnaire answers. For the purposes of the present discussion, a job-related preference may be any indication of a preferred characteristic of a job or career opportunity. For example, a job-related preference may be an indication that a user prefers to work with a particular organization.

The questionnaire answers may include a specification of the target career position. This preference information may be employed by the career path projector 30 to, for example, adjust how careers are graphically depicted in a graphic of a career path. For example, careers along a given career path that more closely match user preferences may be highlighted, sized, or otherwise marked or labeled to distinguish careers or career steps that more closely match user preferences from those that do not closely match the specified user preferences. Furthermore, various types of or characteristics of career paths may be illustrated. For example, graphical features, such as different highlighting, sizing, and so on, may be used to illustrate fast track paths, high performance paths, and critical role career paths may be illustrated.

For the purposes of the present discussion, a fast track path may be any career path that on average, in view of aggregated data, has resulted in a shorter time duration between a first career position and a target career position than a second career path. A high performance path may be any career path that results in workers in a target position having higher average performance metrics than another career path. A critical role path may be any career path within an organization that is currently valued by the organization more than another career path. Critical role paths may include one or more job positions or set of job positions or career steps that must be filled or met by an organization to meet predetermined objectives of the corporation.

A career step may be any task, intermediate job or position, course of study, and so on, that may progress a worker along a career path toward a target career position. A career move may be any transition from a first job position to a second job position. The terms "career," "position," "job," "job position," and "career position" are employed interchangeably herein.

When a user selects an option from the user interface 18 to display careers or jobs that match user job-related preferences and current competencies, the controller 32 may activate the career matcher module 26. The career matcher module 26 includes computer code for comparing the collected user information 38 with career data 36 and accompanying career profiles in view of the configuration data 34, to calculate a degree of match between the user and various careers. A representation of a career and a degree of match may be displayed via the user interface 18.

Exact details as to how a career match value is calculated are implementation specific and may vary accordingly without departing from the scope of the present teachings. For example, in one embodiment, the configuration data 34 includes user specified weights, which have been assigned to each user specified job-related preference. The degree of match between a job and a user may be skewed in accordance with the user specified weights.

When a user selects an option from the user interface 18 to activate monitoring of a user's progress along a selected career path, the controller may activate the path status monitor module 28. The path status monitor module 28 includes computer code for periodically monitoring user profile information 40 to determine when goals, tasks, and associated career steps progress a user along a path toward a target career. Career status monitoring may be conducted at predetermined user configurable time intervals or continuously, or in accordance with another monitoring scheme. For example, the path status monitor module 28 may be adapted to only update or alert the user as to progress along a particular career path when the user profile information 40 is updated to reflect progress, or when a user selects a user option to view progress history or current position along the career path.

The user's progress along a particular career path may be graphically displayed via one or more analytics. Exact details as to how to alert or display status updates to a user are implementation specific and may vary depending upon the implementation without departing from the scope of the present teachings.

When a user selects an option from the user interface 18 to view one or more analytics, the controller 32 may activate the analytics module 24. The analytics module 24 includes computer code for generating a graphical representation of career-related information, e.g., representations of careers, degrees of match, competency gaps, and so on, for display via the user interface 18.

For the purposes of the present discussions, an analytic may be any calculation based on a given input. Certain analytics may be displayed graphically. For example, an analytic that calculates a degree of a match between a user and a candidate position based on information about the user and various candidate positions may be displayed via a bar chart.

A competency gap may be any dearth or lack of a particular skill, knowledge, or performance metric of a person, such as an employee or other user of an embodiment disclosed herein.

A metric may be any measurement, parameter, or other indicator associated with a person or thing. Examples of metrics include sales performance scores or quota attainment numbers, versatility measurements, and so on.

In the present example embodiment, worker profile information 46 retrieved from the HCM application 44 is, by default, anonymous, unless a worker associated with one or more worker profiles 46 logs into the career information system 22 and selects a an option (e.g., a non-anonymous option) to share their profile information with others. For example, the user interface 18 may provide an option for a worker to indicate a willingness to share profile information and be a mentor for others who seek the worker's current job position or a job position that the worker previously held.

Hence, a worker may convert their worker profile information 46 to so called non-anonymous information. For the purposes of the present discussion, non-anonymous information may include any information that is not anonymous, such that a person associated with the information may be named or otherwise identified.

An administrator may employ the administrator user interface 20 to make various adjustments to the career information system 22. For example, an administrator user interface option may enable and administrator to change questions of a questionnaire; to indicate critical role careers and/or paths; to adjust salaries associated with different job positions, and so on. Additional or fewer administrator user options may be provided via the administrator user interface 20 and accompanying system 12, without departing from the scope of the present teachings.

For the purposes of the present discussion, an administrator user interface option may be any user interface control or feature that enables a proprietor or administrator of a system constructed in accordance with an embodiment discussed herein to change or adjust how workers or prospective workers (users) interact with the system and/or the information provided by the system. For example, an enterprise employing an embodiment in accordance with the present teachings may have administrator options to indicate open job positions and positions that the enterprise or organization currently seeks or must fill, and so on.

In certain operative scenarios, one or more of the modules 24-30 may include functionality for interfacing with the calendar application 54, the email application 56, and the social network application 58. For example, the path status monitor module 28 may include computer code for enabling progress updates to a career path to be emailed to a user; or for target dates for completion of certain career goals or tasks to be lodged with the electronic calendar application 54. Data from a user's social network 58 may be retrieved for use, for example, by the analytics module 24 when generating illustrations of numbers of social connections associated with a particular career.

Hence, a user may employ the system 10 to display various factors that may affect career success, such as knowledge, experience, and skill requirements or recommendations for each career step. Career paths, based on what career steps have worked for others, are also displayable. Furthermore, various analytics may facilitate visualization of career opportunities, paths, and user competency gaps to be addressed.

The career information system 22 may represent a tightly integrated HCM solution to extract and analyze core Human Resources (HR) data, talent data, and social network data to facilitate building a complete picture of historically successful career moves; to build a profile of a candidate user, including indications of experiences, mentors, and so on; to suggest one or more suitable career moves; to provide supporting information to help a user fill competency gaps, e.g., in knowledge and experience, as they seek a career opportunity, and so on.

The career information system 22 may be driven by default parameters and/or user configurable parameters, which may include parameters that reflect user priorities. Various processes employed by the career information system 22 may feed off questionnaire answers 42, which may represent answers to key questions used to drive career-related suggestions.

The career information system 22 is adapted to perform various types of analysis of career-related information, such as best-fit analysis between a user profile and a potential job profile. For example, best-fit analysis, as may be implemented in part by the career matcher 26, may compare various candidate careers or positions with a given user's profile information to rank results, e.g., 70% match.

Additional types of analysis may also be provided, such as analysis of career pursued by others who have previously filled the user's current job. Various additional features and user options may enable, for example, employers to configure or set methods and criteria for rendering career paths. For example, certain career paths may be weighted over other career paths based on predetermined criteria; jobs that are particularly needed by an enterprise may be highlighted, and so on.

Hence, the system 10 is adapted to enable a user to identify their current job profile, view the requirements of profiles in various paths, and then compare their current skills/competencies/qualifications to those in the targeted profile(s), i.e., profiles of workers who have attained the target career. A user may import a profile into their development plan to facilitate creation of goals and actions based on competency gaps. In addition, a user may gain insight into opportunities. For example, for a particular job or career, a user may identify open positions and may then be able to apply, nominate themselves, or send an email (e.g., to a manager, via the email application 56) regarding the position.

Figure 2:
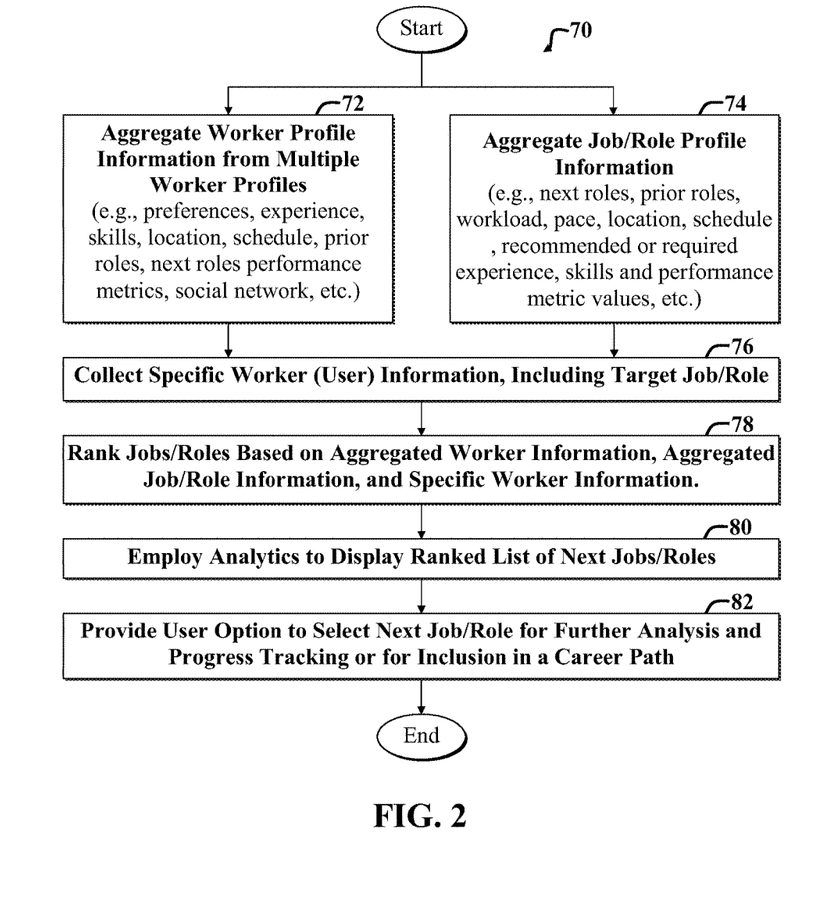
FIG. 2 is a diagram of an example career matching and ranking process adapted for use with the system of FIG. 1.

FIG. 2 is a diagram of an example career matching and ranking process 70 adapted for use with the system 10 of FIG. 1. The example process 70 includes aggregation steps 72, 74, which may be performed simultaneously. A first aggregation step 72 involves aggregating worker profile information from multiple worker profiles. Examples of aggregated information include experience, skill, worker location, schedule, prior roles or jobs and roles/jobs histories, current and historical performance metrics, and so on.

A second aggregation step 74 includes collecting or aggregating available information, called career profile information, about various careers. Examples of career profile information include common previous jobs or roles that workers have had before taking given career position, common subsequent jobs or roles taken after a given career position, performance metrics, location, work schedule, recommended or required experience and skills, recommended or required performance metric values, and so on.

After the aggregating steps 72, 74, a user-information collection step 76 is performed. The user-information collection step 76 includes collecting user specific information, such as by retrieving information from a preexisting worker profile associated with the user and collecting user inputs from a questionnaire and/or other user interface input mechanisms. In the present example embodiment, the collected user information includes an indication of a target career chosen for analysis by a user.

Next, a ranking step 78 includes ranking careers or jobs based on a degree to which characteristics of the jobs match a user's preferences or other information obtained via the aggregating steps 72, 74 and user-information collection step 76.

Subsequently, an analytics step 80 includes employing an analytic to display a ranked or sorted list of jobs or roles that are recommended as next career steps along one or more career paths path toward a specified target career.

Next, an option-providing step 82 includes providing a user option to select, from the ranked or sorted list of jobs, a job for further analysis, progress tracking, and/or other operations. Examples of possible other operations include assigning a selected job to a career path being constructed by a user; assigning a selected job to a watch list for triggering an alert when the job becomes available, and so on.

Figure 3:
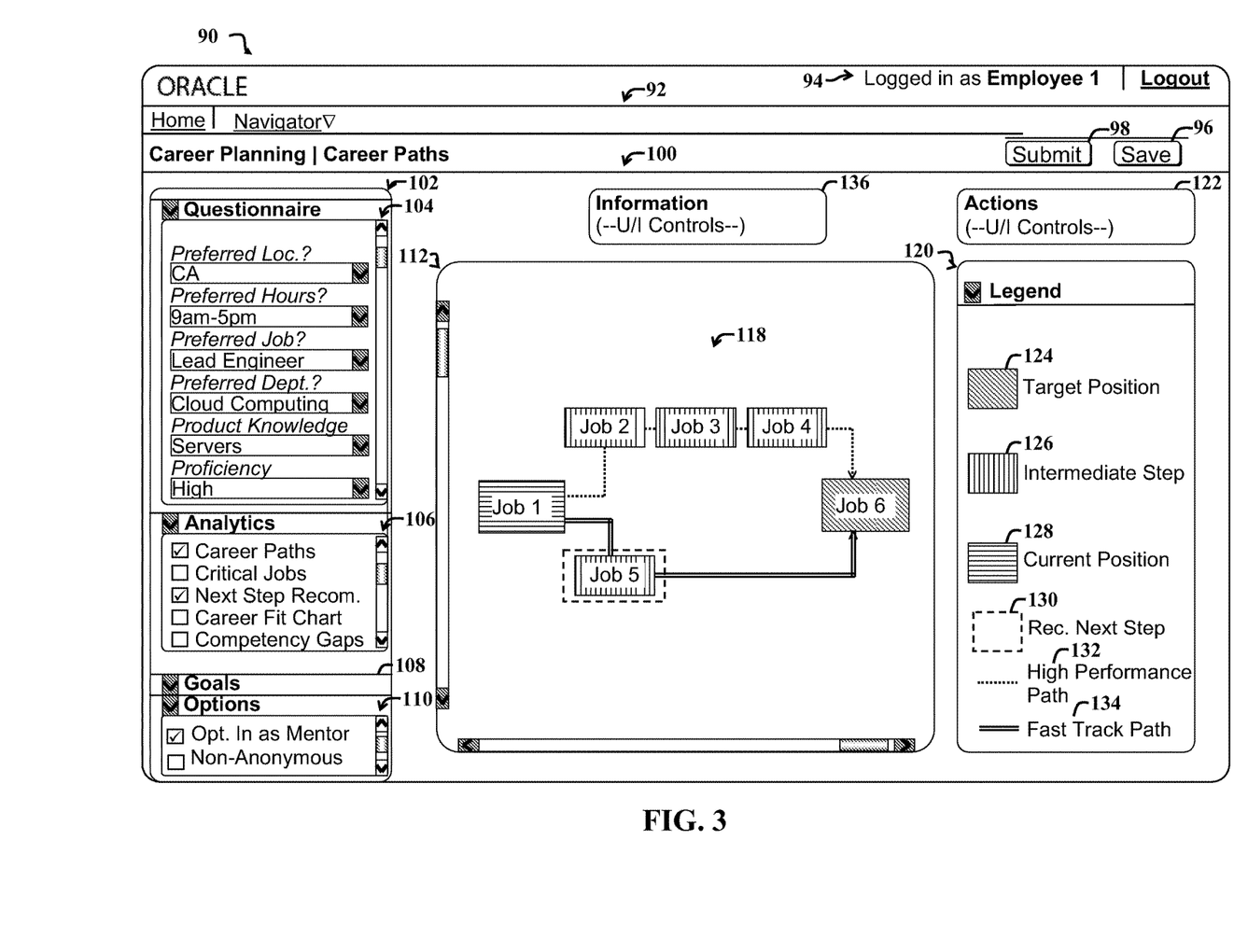
FIG. 3 is diagram of a first example user interface display screen, which may be rendered by the system of FIG. 1.

FIG. 3 is diagram of a first example user interface display screen 90, which may be rendered by the system 10 of FIG. 1. The example display screen 90 includes an upper-right login section 94, which indicates that a first employee, also called the user, is logged into the career information system 22 via the user interface 18 of FIG. 1.

The example display screen 90 includes navigation bars 92 to facilitate navigating among different user interface display screens. The navigation bars 92 indicate that a user has browsed to a career paths section of a career planning user interface section. A save button 96 and a submit button 98 represent options to save and submit the user interface display screen 90 or contents thereof, respectively. Selection of the submit button 98 may cause the user interface display screen 90 to reload or refresh based on user selections made via the display screen 90.

The example display screen 90 further includes a career paths section 100, which includes a questionnaire 102 with various questions and associated input fields 104 for enabling a user to select or otherwise provide answers to particular questions. Various questions and user interface controls shown in the questionnaire 102 are merely illustrative and may vary depending upon the needs of a given implementation. For example, additional fields may be provided for enabling a user to assign weights or priority values to answers to specific questions.

The example display screen 90 further includes an analytics configuration section 106, which includes various user interface controls, such as check boxes, which represent user options to activate display of various analytics pertaining to career-related information assembled via the career information system 22 of FIG. 1. Example selectable analytics include career paths, critical jobs, next step recommendation, competency gaps, and so on. Analytics selected via the analytics section 106 may appear in an adjacent display region 112.

In the present example embodiment, a user has selected to display career paths and recommended next job or career step that a user may take to reach a target career (Job 6). An example career path 118 is displayed in the display section 112. An adjacent legend 120 indicates example shading or graphics features (124-134) used in the career path 118 to illustrate a target position 124, intermediate step 126, current position 128, recommended next step 130, high performance path 132, and fast track path 134. For example a first job (Job 1) illustrated in the career path 118 represents the job currently held by the user. Jobs 2-5 represent intermediate jobs along two different career paths between the current job (Job 1) and the target job (Job 6). Job 5 is indicated as being recommended as a next job for the user to take. Job 5 is indicated as being part of a fast track career path, whereas Jobs 2-4 are indicated as being part of a high performance career path.

An additional information section 136 may provide additional career-related information and associated user interface controls, which may be implementation specific. Similarly, an actions section 122 may provide additional user options to take certain implementation specific actions from the current user interface display screen 90.

An example goals section 108 may provide user interface controls for accessing, configuring, setting, and so on, various goals in view of one or more of the job paths 118 shown in the display region 112. Exact details of the goals section 108, the information section 136, and the actions section 122 are implementation specific and may vary without departing from the scope of the present teachings.

An example options section 110 provides various user interface controls to set options for use by the career information system 22 of FIG. 1. For example, a user may select an option to make themselves available as a mentor to other users, and/or a user may select a non-anonymous option to enable sharing of their specific worker profile information to others without hiding their identity.

Figure 4:
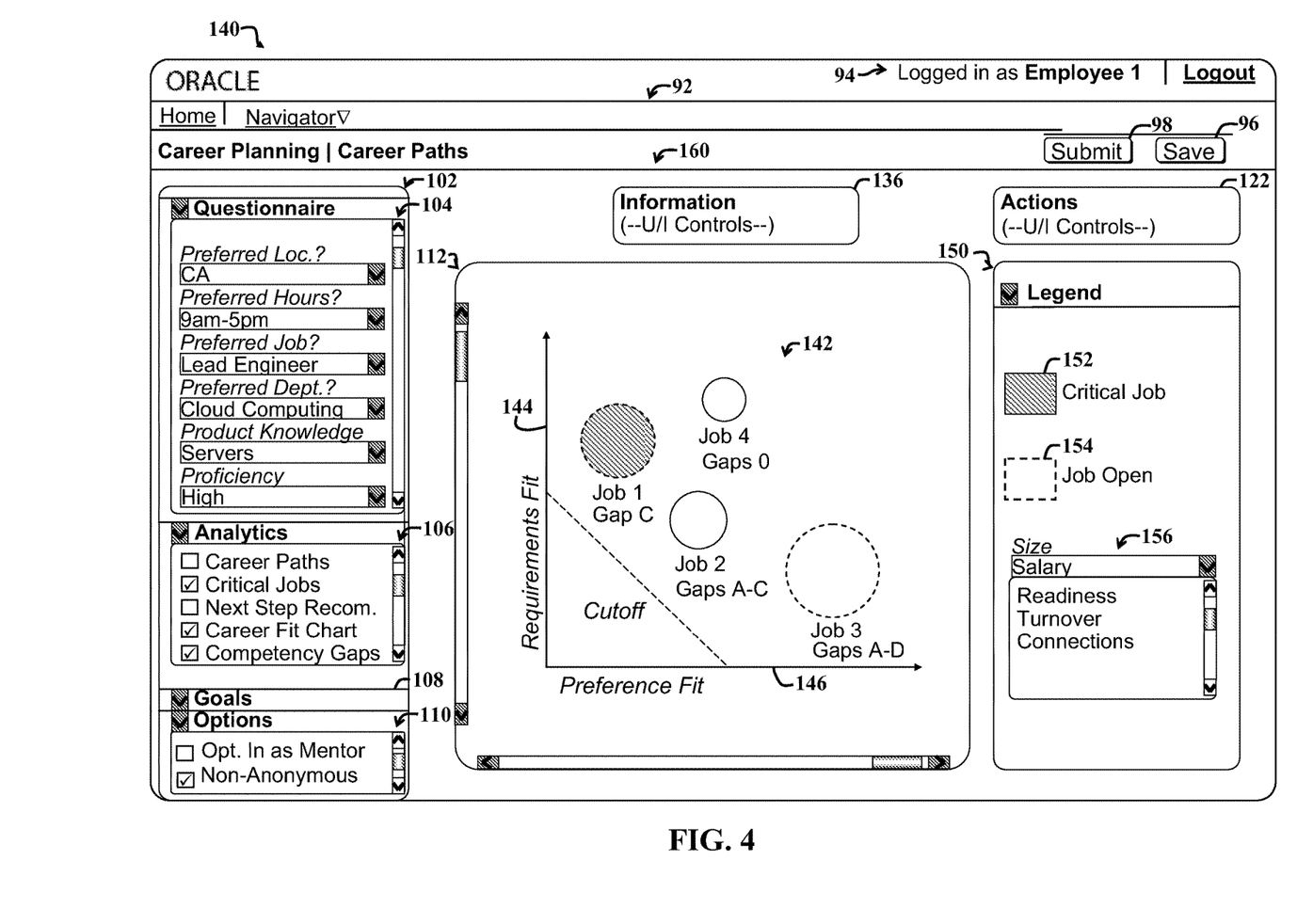
FIG. 4 is a diagram of a second example user interface display screen, which may be rendered via the system of FIG. 1.

FIG. 4 is a diagram of a second example user interface display screen 140, which may be rendered via the system 10 of FIG. 1. The example user interface display screen 140 is similar to the user interface display screen 90 of FIG. 3 with the exception that a user has selected different analytics, via the analytics section 106, for display via the display region 112.

In the present example embodiment, a user has chosen to display a career fit chart 142 along with indications of competency gaps and critical job status. An adjacent legend 150 shows a critical job indication 152, a open job indication 154, and includes a sizing section 156 to enable a user to adjust sizes of job representations in the career fit chart 142 based on selectable criterion, such as readiness of the user to take a job, turnover rate associated with a job, numbers of social connections on average that are associated with the job, and so on. For example, a user has currently selected to size the job representations of the fit chart 142 according to job pay, i.e., salary.

The example career fit chart includes a vertical axis 144, which represents values reflecting a fit of a job in accordance with how well a job's requirements fit characteristics of the user. A horizontal axis 146 represents values reflecting how well a job fits or matches user specified job preferences. For example, the positioning of a first job (Job 1) in the career fit chart indicates that the user fulfills many of the requirements of the first job, but that the first job does not match the user's preferences as well as, for example, a third job (Job 3).

In the analytics section 106, a user has selected an option to display competency gaps. Accordingly, the career fit chart 142 lists various user competency gaps (e.g. Gaps A-D) that a user may address before applying for a particular job. For example, a fourth job (Job 4) indicates that the user has no competency gaps, and hence the user is considered qualified to take Job 4. Hence, Job 4 is positioned high on the requirements fit axis 144. Similarly, a user should fill a Gap C to fulfill the competency requirements for Job 1. Gap C might be, for example, the passing of a particular instructional course that job applicants must take before taking Job 1.

Note that various analytics and accompanying graphical illustrations, shading, or other user interface features employed to illustrate various career-related information are implementation specific and may vary, without departing from the scope of the present teachings. For example, the various jobs (Job 1-4) may be illustrated via three-dimensional rotatable icons, which may be rotated to view additional information about a particular job. Similarly, the jobs represented in the career fit chart 142 may be hyperlinked to different user interface screens that contain more information about a particular job.

Figure 5:
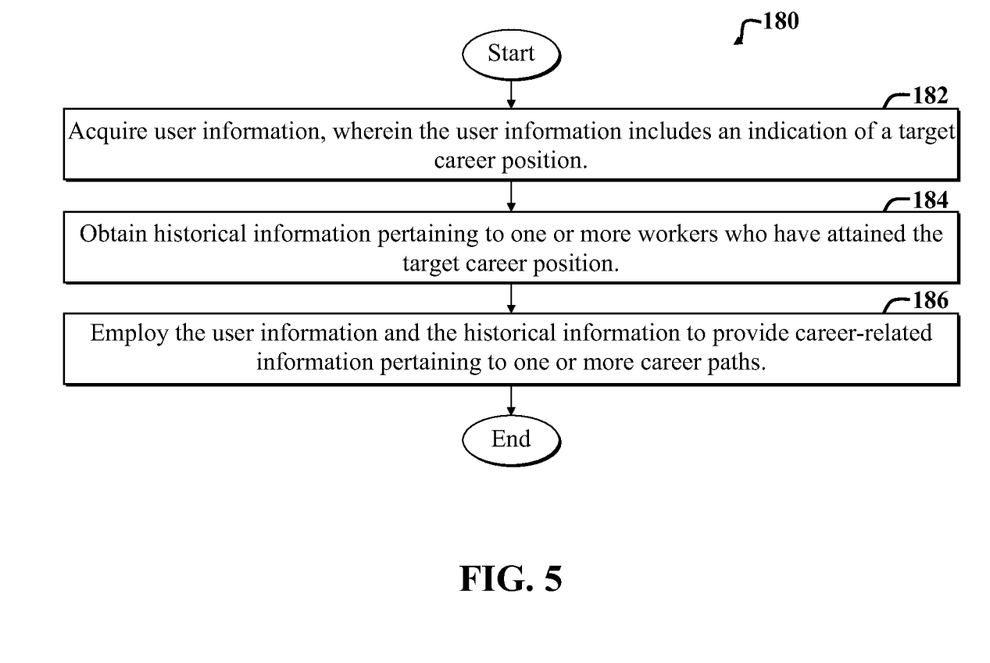
FIG. 5 is a flow diagram of a first method adapted for use with the embodiments of FIGS. 1-4.

FIG. 5 is a flow diagram of a first method 180 adapted for use with the embodiments of FIGS. 1-4. The first example method 180 includes an initial acquiring step 182, which includes acquiring user information, including an indication of a target career position.

An obtaining step 184 includes obtaining historical information pertaining to one or more workers who have attained the target career position.

An employing step 186 includes employing the user information and the historical information to provide career-related information pertaining to one or more career paths.

Figure 6:
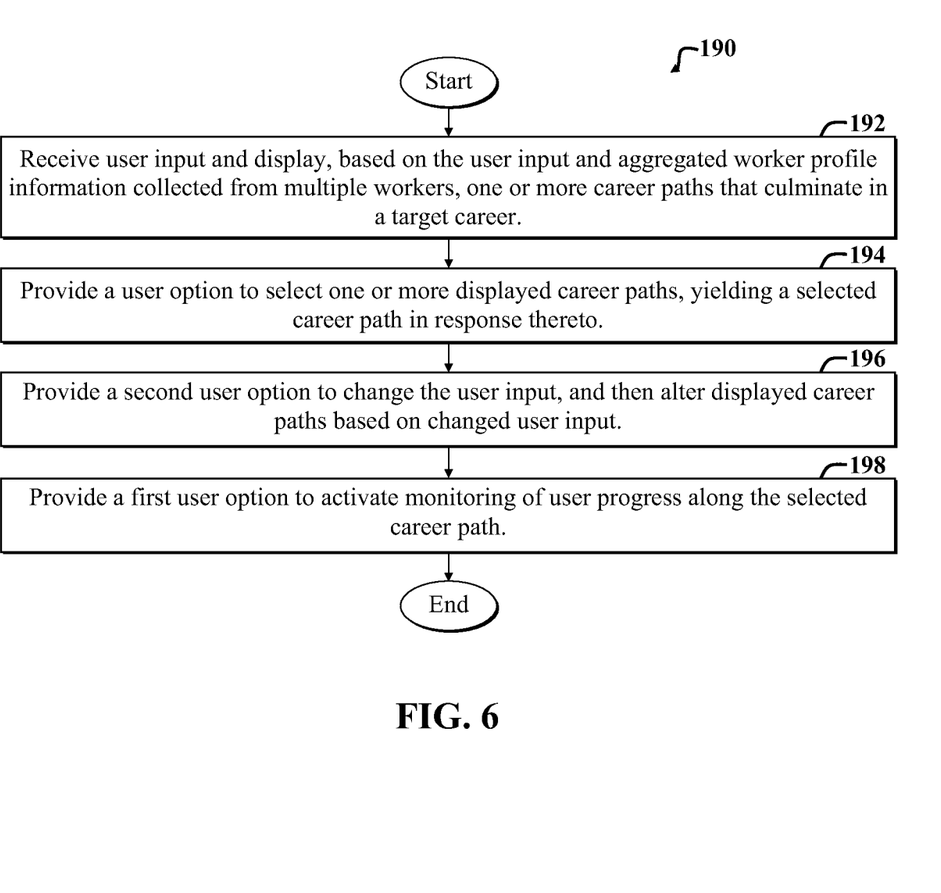
FIG. 6 is a flow diagram of a second method adapted for use with the embodiments of FIGS. 1-4.

FIG. 6 is a flow diagram of a second method 190 adapted for use with the embodiments of FIGS. 1-4. The second method 190 includes first step 192, which involves receiving user input and display, based on the user input and aggregated worker profile information collected from multiple workers, one or more career paths that culminate in a target career.

The user input may include, for example, answers to a questionnaire and may further include information, such as job-related preferences, willingness to travel, working hours, location of job/career, and so on. The preferences may have a priority ranking or weighting for use in generating analytics, such as graphical displays of possible career paths. Hence, one or more user interface options may be provided to enable a user to indicate job-related preferences and to assign one or more priority values or weights a particular job-related preference.

A second step 194 includes providing a user option to select one or more displayed career paths, yielding a selected career path in response thereto. For example, a career path from the paths 118 of FIG. 3 may be user selectable, such as via a mouse.

A third step 196 includes providing a second user option provide a second user option to change the user input, such as answers to the questionnaire 104 of FIG. 3, and then alter displayed career paths based on changed user input. This enables users to conduct so called what-if analysis to determine what different or additional career paths would become available if different user inputs are provided.

An example fourth step 198 includes providing e a first user option to activate monitoring of user progress along the selected career path.

Note that more or fewer steps may be included in the methods 180, 190 of FIGS. 5-6, or various steps may be reordered without departing from the scope of the present teachings. For example, an additional step may include providing an administrator user interface option to adjust career opportunities, e.g., job positions, that are displayable via the system 10 of FIG. 1 via a user interface display screen, such as the display screens of FIGS. 3-4.

Hence, certain embodiments discussed herein may employ anonymous aggregated data applicable to employee career development and progression and enterprise employee recruitment and retainment to provided career-related insight that may facilitate success of employees and accompanying enterprises.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method for selectively providing career-related information, the method comprising:
    displaying a graphical user interface on a display screen;
    retrieving, via a network, information from a social network application employed by one or more workers;
    acquiring user information of a user, via the graphical user interface displayed on the display screen, wherein the user information includes an indication of a target career position, user preferences, and user skills, competencies, and qualifications;
    obtaining aggregated information pertaining to the one or more workers who have attained the target career position, wherein the aggregated information includes worker profiles of the one or more workers who have attained the target career position, wherein the worker profiles include worker skills, experience, jobs histories, and historical performance metrics, and current performance metrics, wherein the aggregated information includes the information from the social network application;
    comparing portions of the user information and the aggregate information;
    activating a career matcher module, wherein the career matcher module:
        calculate a comparison between the user information with career data and career profiles in view of configuration data; and
        calculate, based on the comparison, a degree of match between the user and various careers;
        graphically displays, on the display screen, a representation of a career and the degree of match via the graphical user interface;
    calculating a match between one or more career paths in the aggregated information and the user information, wherein each career path leads to the target career position, and wherein each career path includes one or more intermediate positions;
    causing career-related information to be graphically displayed on the display screen, wherein the career-related information comprises causing the one or more career paths to be displayed, wherein each of the one or more career paths includes one or more of the intermediate positions between a current position for which the user is qualified to fulfill and the target career position;
    generating illustrations of numbers of social connections associated with the target career position based on the information from the social network application;
    displaying a career fit chart along with indications of competency gaps and critical job status;
    enabling adjustment of sizes of job representations in the career fit chart based on selectable criterion that includes readiness to take the target career position, turn over rate of the target career position, and average number of the social connections;
    displaying three-dimensional rotatable icons representing the career-related information; and
    rotating at least one of the three-dimensional rotatable icons to view additional information about a particular job.

2. The method of claim 1, wherein obtaining aggregated information includes collecting anonymous information from one or more profiles of the one or more workers, wherein collecting anonymous information from one or more profiles includes communicating with a human capital management (HCM) system of an organization and extracting worker profile information therefrom, and wherein the worker profile information is included in the anonymous information.

3. The method of claim 1, wherein obtaining aggregated information includes collecting anonymous information from one or more profiles of the one or more workers, further including providing a user option for a worker to offer non-anonymous information pertaining to the user to other users of a system employing the method.

4. The method of claim 1, wherein obtaining aggregated information includes collecting anonymous information from one or more profiles of the one or more workers, further including providing a user option for a worker to indicate a willingness to be a mentor.

5. The method of claim 1, wherein provided career-related information includes an indication of a fast track career path.

6. The method of claim 1, wherein the provided career-related information includes an indication of a high performance career path.

7. The method of claim 1, wherein the career-related information includes an indication of one or more career paths that include one or more positions that are currently being sought by an organization.

8. The method of claim 7, wherein the indication of one or more paths includes an indication of one or more critical role paths.

9. The method of claim 1, wherein the career-related information includes an indication of one or more competency gaps of the user to be filled to enable a user to attain the target career position.

10. The method of claim 1, wherein the information pertaining to one or more career paths includes an indication of one or more immediate career steps that may facilitate attaining the target career position.

11. The method of claim 10, wherein the career-related information further includes an indication of one or more career steps taken by one or more workers who initially held a similar career position as a user of the method.

12. The method of claim 1, wherein the user is qualified to fulfill one of the one or more intermediate positions if the user has no competency gaps.

13. The method of claim 1, wherein the career-related information includes a suggestion of a career move that a user may make.

14. The method of claim 1, further including providing career-related information via one or more analytics.

15. The method of claim 1, further including providing a first user interface option to construct a profile that includes the user information.

16. An apparatus comprising:
a digital processor coupled to a display and to a processor-readable storage device, wherein the processor-readable storage device includes one or more instructions executable by the digital processor to perform operations comprising:
displaying a graphical user interface on a display screen;
retrieving, via a network, information from a social network application employed by one or more workers;
acquiring user information of a user, via the graphical user interface displayed on the display screen, wherein the user information includes an indication of a target career position, user preferences, and user skills, competencies, and qualifications;
obtaining aggregated information pertaining to the one or more workers who have attained the target career position, wherein the aggregated information includes worker profiles of the one or more workers who have attained the target career position, wherein the worker profiles include worker skills, experience, jobs histories, and historical performance metrics, and current performance metrics, wherein the aggregated information includes the information from the social network application;
comparing portions of the user information and the aggregate information;
activating a career matcher module, wherein the career matcher module:
calculate a comparison between the user information with career data and career profiles in view of configuration data; and
calculate, based on the comparison, a degree of match between the user and various careers;
graphically displays, on the display screen, a representation of a career and the degree of match via the graphical user interface;
calculating a match between one or more career paths in the aggregated information and the user information, wherein each career path leads to the target career position, and wherein each career path includes one or more intermediate positions;
causing career-related information to be graphically displayed on the display screen, wherein the career-related information comprises causing the one or more career paths to be displayed, wherein each of the one or more career paths includes one or more of the intermediate positions between a current position for which the user is qualified to fulfill and the target career position;
generating illustrations of numbers of social connections associated with the target career position based on the information from the social network application;
displaying a career fit chart along with indications of competency gaps and critical job status;
enabling adjustment of sizes of job representations in the career fit chart based on selectable criterion that includes readiness to take the target career position, turn over rate of the target career position, and average number of the social connections;
displaying three-dimensional rotatable icons representing the career-related information; and
rotating at least one of the three-dimensional rotatable icons to view additional information about a particular job.

17. A non-transitory processor-readable storage device including instructions executable by a digital processor for modifying a workplace decision-making hierarchy, the processor-readable storage device including one or more instructions for:
displaying a graphical user interface on a display screen;
retrieving, via a network, information from a social network application employed by one or more workers;
acquiring user information of a user, via the graphical user interface displayed on the display screen, wherein the user information includes an indication of a target career position, user preferences, and user skills, competencies, and qualifications;
obtaining aggregated information pertaining to the one or more workers who have attained the target career position, wherein the aggregated information includes worker profiles of the one or more workers who have attained the target career position, wherein the worker profiles include worker skills, experience, jobs histories, and historical performance metrics, and current performance metrics, wherein the aggregated information includes the information from the social network application;
comparing portions of the user information and the aggregate information;
activating a career matcher module, wherein the career matcher module:
calculate a comparison between the user information with career data and career profiles in view of configuration data; and
calculate, based on the comparison, a degree of match between the user and various careers;
graphically displays, on the display screen, a representation of a career and the degree of match via the graphical user interface;
calculating a match between one or more career paths in the aggregated information and the user information, wherein each career path leads to the target career position, and wherein each career path includes one or more intermediate positions;
causing career-related information to be graphically displayed on the display screen, wherein the career-related information comprises causing the one or more career paths to be displayed, wherein each of the one or more career paths includes one or more of the intermediate positions between a current position for which the user is qualified to fulfill and the target career position;
generating illustrations of numbers of social connections associated with the target career position based on the information from the social network application;
displaying a career fit chart along with indications of competency gaps and critical job status;

enabling adjustment of sizes of job representations in the career fit chart based on selectable criterion that includes readiness to take the target career position, turn over rate of the target career position, and average number of the social connections;

displaying three-dimensional rotatable icons representing the career-related information; and rotating at least one of the three-dimensional rotatable icons to view additional information about a particular job.

18. The method of claim 1, wherein the method further comprises:

ranking the one or more career paths; and graphically displaying the one or more career paths according to ranking.

* * * * *

UNITED STATES PATENT AND TRADEMARK OFFICE
CERTIFICATE OF CORRECTION

PATENT NO.       : 10,262,279 B2
APPLICATION NO.  : 13/371279
DATED            : April 16, 2019
INVENTOR(S)      : Barnfield et al.

Page 1 of 1

It is certified that error appears in the above-identified patent and that said Letters Patent is hereby corrected as shown below:

In the Specification

In Column 7, Line 59, delete "a an" and insert -- an --, therefor.

Signed and Sealed this
Third Day of November, 2020

Andrei Iancu
*Director of the United States Patent and Trademark Office*